INVENTORS.
Benedict Welte,
BY Albert H. Werden.
Harness, Dickey & Pierce
ATTORNEYS.

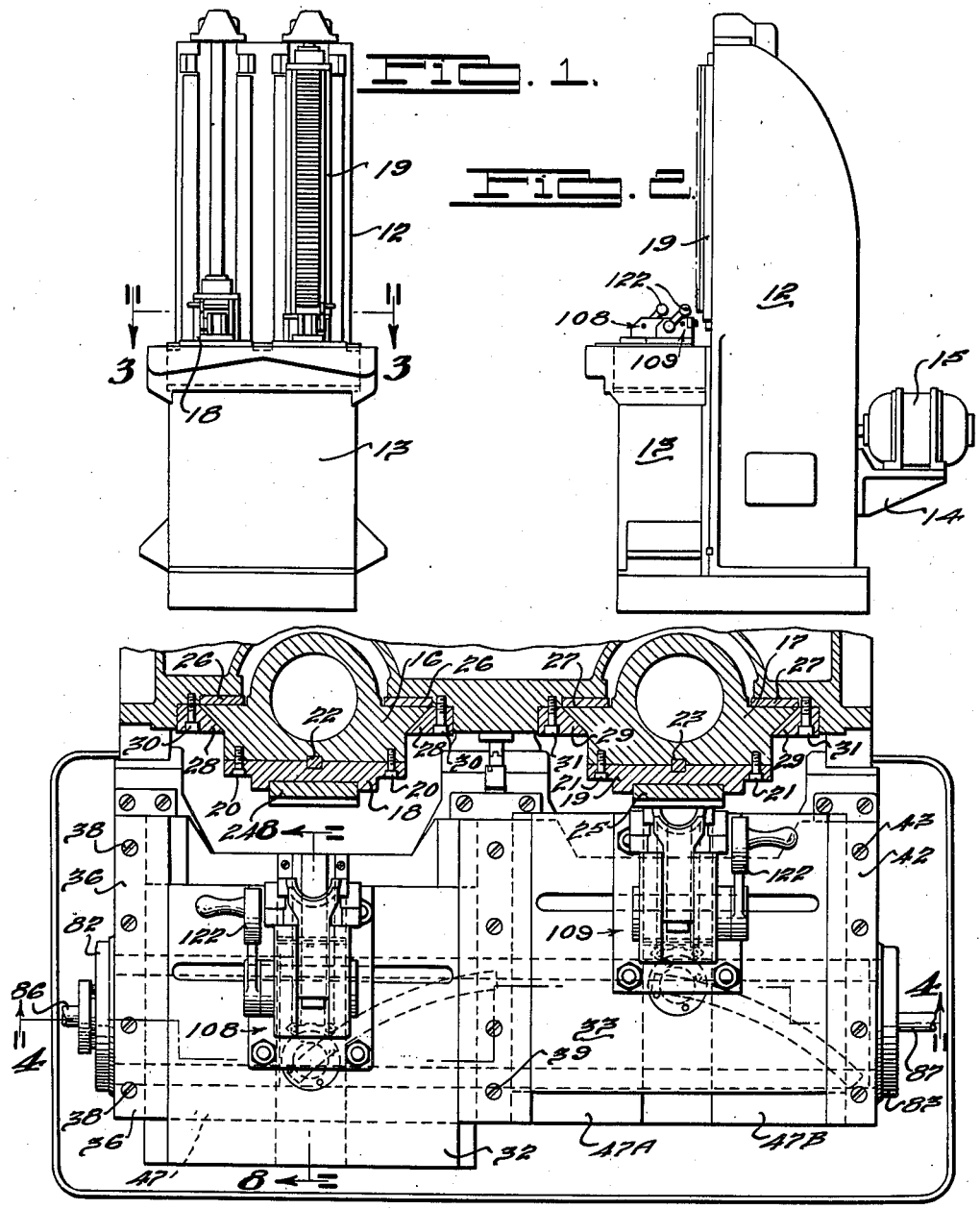

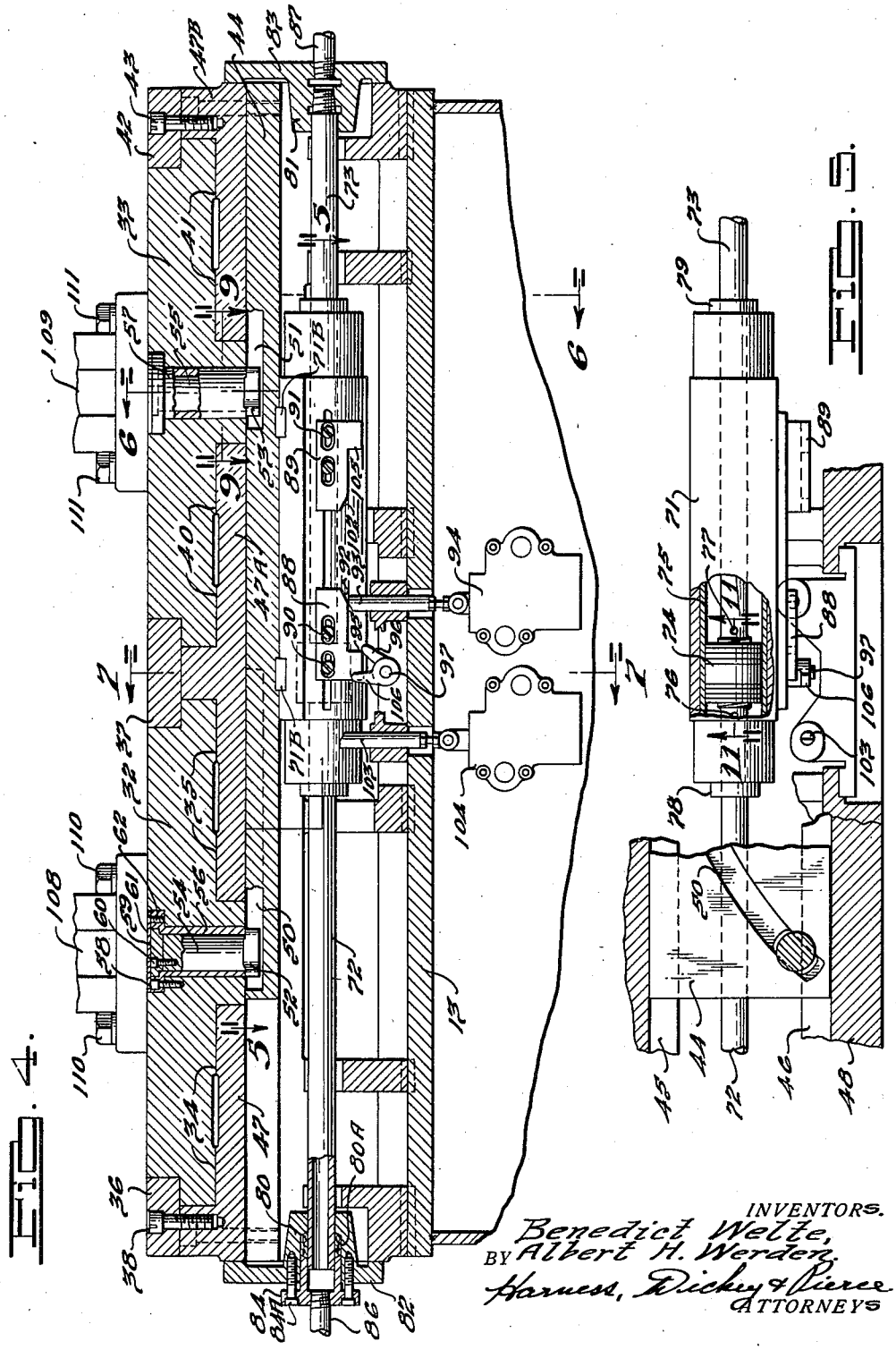

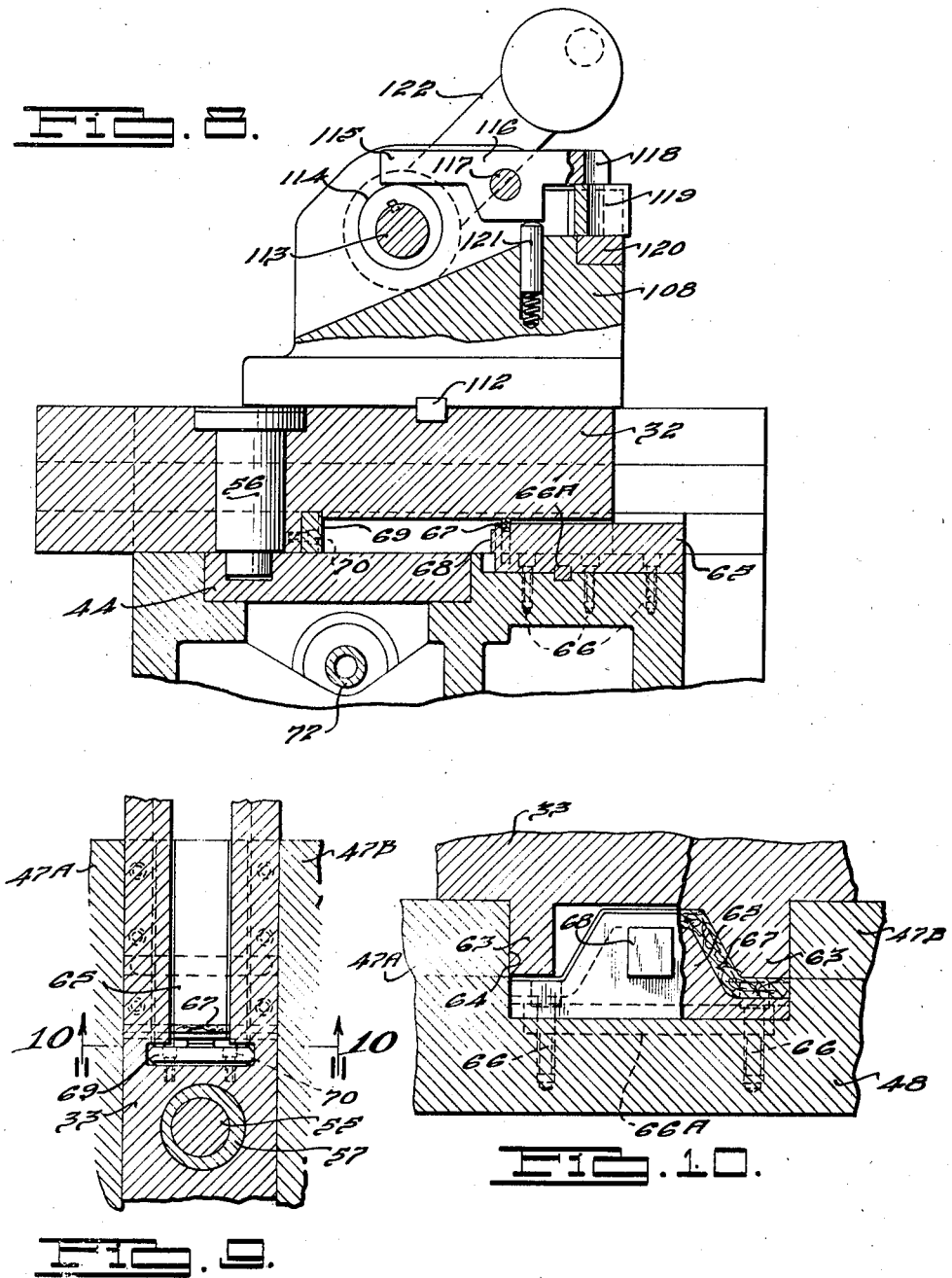

Patented Dec. 17, 1940

2,225,191

UNITED STATES PATENT OFFICE 2,225,191

BROACHING MACHINE

Benedict Welte, Berkley, and Albert H. Werden, Royal Oak, Mich., assignors to Colonial Broach Company, Detroit, Mich., a corporation of Delaware Application April 4, 1938, Serial No. 199,756

8 Claims. (Cl. 90—33)

This invention relates to broaching machines of the dual ram type.

The main objects of this invention are to provide an improved broaching machine of the dual ram type, in which the work holders move alternately into position so that the work held thereby is acted on by the broaches in alternate manner, one work holder being unloaded and reloaded while the broach is acting on the work being held by the other work holder; to provide a machine of this character which will have a relatively high production; to provide a dual type high production broaching machine of relatively simple and sturdy construction; to provide a broaching machine in which the operating parts will have comparatively little wear and, therefore, will have exceptionally long life; to provide a broaching machine which will continue to hold successive pieces of work accurately positioned with respect to the broaching tool over a long period of time, even though wear occurs on the work holder actuating mechanism, such wear not in any wise affecting the accurate positioning of the work; to provide a machine of this character in which the work holder platen actuating means acts directly in line with and close to the broaching ram; to provide a construction in which the work holding platen is rigidly supported directly on the machine frame work and securely held so as to not either rock away from the broaching ram at the beginning of the cut, or rock into the broach later on in the stroke; to provide a broaching machine which may be easily and readily disassembled for inspection, cleaning, repair or replacement of parts, and to provide a construction in which the abutting contacting limit stop faces for accurately positioning the work holding platen with respect to the broach are well protected from chips or foreign matter which might otherwise get between these contacting faces and thereby affect the correct positioning of the work with respect to the broach.

An illustrative embodiment of this invention is shown in the accompanying drawings, in which:

Fig. 1 is a view in front elevation of the improved broaching machine;

Fig. 2 is a view in side elevation of the same;

Fig. 3 is an enlarged sectional view, taken on the line 3—3 of Fig. 1, looking in the direction indicated by the arrows;

Fig. 4 is an enlarged sectional view taken on the line 4—4 of Fig. 3, looking in the direction indicated by the arrows;

Fig. 5 is a fragmentary view, partly in section, and partly in elevation, taken on the line 5—5 of Fig. 4, looking in the direction indicated by the arrows;

Fig. 8 is an enlarged, fragmentary, sectional view taken on the line 8—8 of Fig. 3, looking in the direction indicated by the arrows;

Fig. 9 is an enlarged, fragmentary, sectional view taken on the line 9—9 of Fig. 4, looking in the direction indicated by the arrows;

Fig. 10 is an enlarged, fragmentary, sectional view taken on the line 10—10 of Fig. 9, looking in the direction indicated by the arrows.

Figure 6:
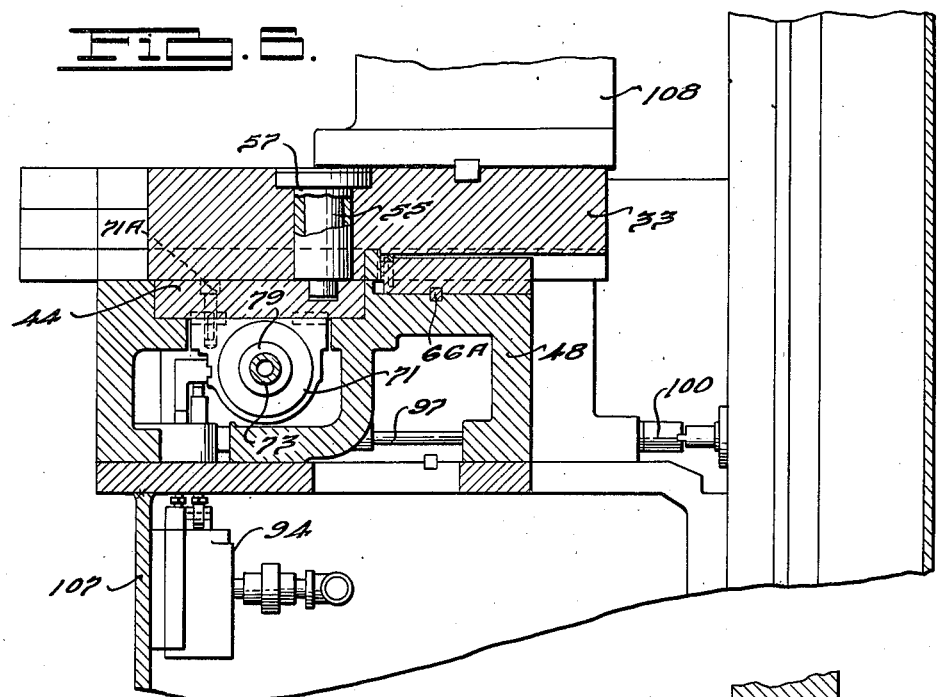
Fig. 6 is an enlarged, fragmentary, sectional view taken on the line 6—6 of Fig. 4, looking in the direction indicated by the arrows.

In the construction shown in the drawings, a vertically extending frame, generally designated 12, is provided with a horizontally disposed shelf portion 13 extending along one side thereof and with a laterally extending bracket 14 at the opposite side thereof, which supports an electric motor 15. The motor 15 drives a hydraulic pump, the fluid from which is used to operate the various elements of the broaching machine, and the controls for operating the same are shown in detail in the copending application of Benedict Welte, Serial No. 203,654, filed April 22, 1938, and assigned to the assignee of the present invention.

The vertical face of the frame 12, adjacent to and above the work table 13, is provided with a pair of spaced, parallel, vertically slidable hydraulic rams 16 and 17 of identical construction which have tool holders 18 and 19, respectively, secured to their front faces by cap screws 20 and 21, respectively, and which are held in trued position by keys 22 and 23, respectively. The tool holders 18 and 19 are shown provided with surface broaches 24 and 25, respectively.

The rams 16 and 17 are hydraulically operated in the usual manner of broaching machines and are mounted on strips of bearing metal 26 and 27, respectively, which form ways for the rams and are held thereagainst by retaining strips 28 and 29, respectively, which are secured by cap screws 30, and 31, respectively.

A pair of work holder platens 32 and 33 are slidably mounted in spaced, parallel relation and are reciprocable toward and away from the vertically reciprocable rams 16 and 17, respectively. The platen 32 is slidable on horizontally disposed ways 34 and 35 and the opposite side marginal edges are cut out to receive hold-down bars 36 and 37 which overlap the edges of the platen, as shown most clearly in Fig. 4, and which are held to base plates 47 and 47A by cap screws 38 and 39, respectively. Likewise, the platen 33, which is of the same construction as the platen 32, is slidably mounted on ways 40 and 41 of base plates 47A and 47B and is retained in the same manner by a hold-down bar 42 held by cap screws 43 and the opposite overlapping edge of the bar 37.

Means are provided for reciprocating the platens 32 and 33 alternately toward and away from their respective broaching rams and comprise a horizontally disposed reciprocable cam plate 44, having its opposite marginal edges mounted on guideways 45 and 46 of a base support 48. The cam plate 44 is held on its ways and retained on the work table by the base plates 47, 47A and 47B, which are held to the base support 48 by cap screws 49. The upper surface of the slide 44 is provided with arcuate grooves 50 and 51, which receive snugly fitting depending cam lugs 52 and 53, respectively, integrally formed on the lower ends of vertically disposed pins 54 and 55, respectively, which are mounted in the work holder platens 32 and 33, respectively. The cam lugs 52 and 53 are elongated in the direction of the grooves and shaped to conform to the curvature thereof, so as to present a broad bearing surface for engagement with the side walls of their respective grooves, and the pins are of identical construction and mounting so that a detailed description of one will suffice for both.

Referring particularly to Figs. 4 and 9, pins 54 and 55 are surrounded by eccentric bushings 56 and 57, respectively, which are rotatable in their respective platens 32 and 33 for adjusting the platens to compensate for manufacturing inaccuracies. The bushings are secured in adjusted position by cap screws 58 which extend through a radially extending flange on the top end of the bushings and which is screwed into the platen. The cam lugs on the lower ends of the pins 54 and 55 overlap the lower ends of their respective bushings, and the pins are retained within the bushings by separable heads 59 which are secured to the upper ends of the pins by screws 60. The heads 59 have radially extending flanges which are received in annular grooves formed in the bushings, as shown most clearly in Fig. 4 of the drawings with respect to the pin 54. The pin and bushing assemblies are covered by a plate 61, the top surface of which is flush with the top surface of the platen 32 and which is secured in place by screws 62.

As shown most clearly in Figs. 9 and 10 of the drawings, the medial part of the platen 33, on its under side, is provided with a depending rib 63, which is embraced between and bears against vertical side walls of a slot 64 formed between the base plates 47A and 47B. The slot 64 is relatively broad and flat bottomed and receives a stop member 65 which is secured to the base 48 by cap screws 66 and a key 66A. A felt wiper 67 is provided for keeping chips and foreign matter from entering and getting to the contact face at the inner end thereof. The end of the stop member 65 toward the pin 55 terminates in a rectangular stop face 68 which abuts against a similar complementary face formed on a plate 69 which is secured in a slot formed in the platen rib 63 by screws 70 and which serves as a limit stop for movement of the platen 33 toward its broaching ram. The same construction is embodied in the platen 32 and for the same purpose.

Figure 11:
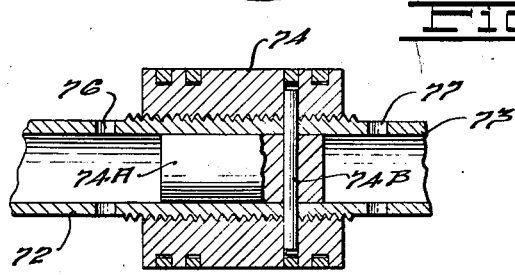
Fig. 11 is an enlarged, fragmentary, sectional view taken on the line 11—11 of Fig. 5, looking in the direction indicated by the arrows.

The under side of the cam plate 44 has secured thereto a hydraulic cylinder 71 by cap screws 71A. The cylinder 71 is accurately aligned on the cam plate 44 by longitudinally extending keys 71B, and the driving thrust is taken by a pair of transversely disposed keys 71C. The cylinder 71 is reciprocable on a relatively stationary seamless steel tube which forms hollow piston rods 72 and 73 extending from opposite axial ends of a piston 74, within the hydraulic cylinder 71. The hollow piston rods 72 and 73 are separated from communication with each other by a dowel pin plug 74A which is pressed into the tube, as shown in Fig. 11, and the piston 74 is preferably secured by screwing onto a tapered thread. When tightly secured thereon the piston is drilled radially through the bottom of one of its piston ring grooves, and a dowel pin 74B driven therethrough, which also passes through the plug 74A, thus holding the plug from being axially displaced by differential pressures to which it is subjected. The cylinder 71 is provided with a lining 75 in the usual manner and the hollow piston rods communicate with the interior of the hydraulic cylinder at opposite sides of the piston 74 by apertures 76 and 77 which extend through the walls of the piston rods 72 and 73, respectively, closely adjacent to the piston 74. The opposite ends of the hydraulic cylinder are provided with stuffing boxes 78 and 79, which are provided with packing for preventing the leakage of fluid around the piston rods 72 and 73, respectively.

The oppositely extending outer ends of the piston rods 72 and 73 are mounted and sealed in inwardly extending hubs or bosses 80 and 81, respectively, of end frame plates 82 and 83, respectively, which are secured against the opposite outer sides of the supporting framework.

The outer end of the piston rod 73 is exteriorly threaded with a taper pipe thread and the boss 81 threaded tightly thereon. The plate 83 is drilled in axial alignment with the piston rod 73 and is interiorly threaded to receive a hydraulic line pipe 87. The outer end of the piston rod 72 has a slip fit in the inner end of the hub or boss 80, and said boss is counterbored to receive packing material 80A which is held tightly against the outer walls of the piston rod by a packing gland 84 which is secured by screws 84A.

The outer side of the hydraulic cylinder 71 is provided with hydraulic valve actuating blocks 88 and 89, and are adjustably mounted thereon by means of screws 90 and 91, respectively, which extend through longitudinal slots formed in their respective blocks. The block 88 has a cam surface 92 at the leading edge thereof which is adapted to engage the upstanding beveled end of a vertically disposed plunger 93, the lower end of which is connected to and controls a hydraulic valve 94.

The block 88 is also provided with a depending lug 95, positioned to engage and actuate an upstanding finger 96, which is rigidly mounted on one end of a rock shaft 97. The front end of the rock shaft 97 is journaled in a bushing 98 carried by the base frame 48, and its opposite end is mounted in a similar bushing 99 through which it protrudes, and the protruding end is provided with a universal coupling generally designated 100. The coupling 100 connects the shaft 97 to one end of a shaft 101, the other end of which is connected to hydraulic control valves (not shown) which control the flow of fluid under pressure to the vertically reciprocable broaching rams 16 and 17.

The shaft 101 is journaled in a bushing 101A held in the machine framework by a retaining ring 101B which is secured by screws 101C.

The valve operating block 89 is also provided with a cam surface 102 on its leading edge laterally offset with respect to block 88 and valve plunger 93, and it is positioned to engage the top beveled end and depress a plunger 103, the lower end of which is connected to and operates a hydraulic control valve 104.

The block 89 is also provided with a depending lug 105 laterally offset with respect to the lug 95 and finger 96, and in position to engage and actuate an upstanding finger 106 which is rigid on the shaft 97 for rocking the shaft in the opposite direction.

Figure 7:
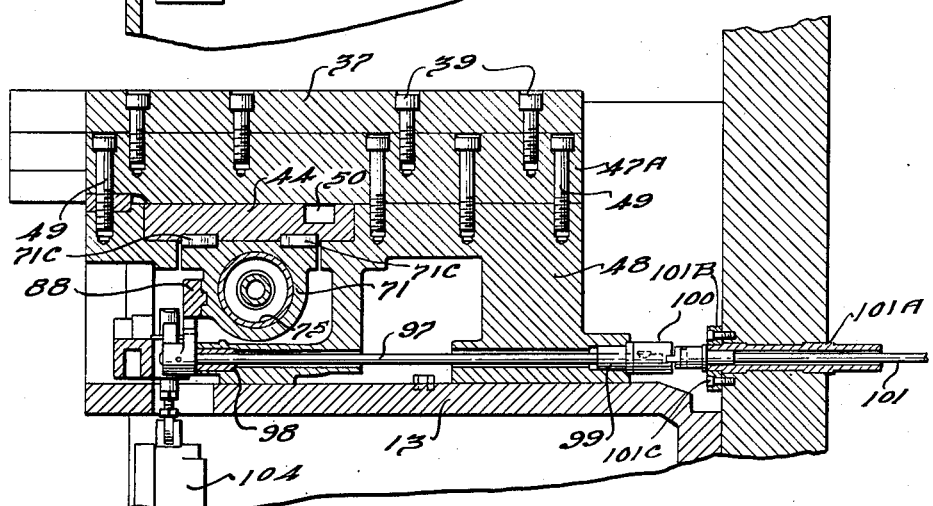
Fig. 7 is an enlarged, fragmentary, sectional view taken on the line 7—7 of Fig. 4, looking in the direction indicated by the arrows.

The hydraulic control valves 94 and 104, through the circuit fully disclosed in applicant's hereinabove referred to copending application, control the flow of fluid under pressure to the hydraulic cylinder 71, reciprocation of which moves the work holding platens 32 and 33 toward and away from their respective broaches, and are of the shock absorbing type which slows up movement near the end of the stroke, and cushions the stopping of the moving parts. As shown most clearly in Figs. 6 and 7 of the drawings, the valves 94 and 104 are secured to the inside of the front apron 107 of the supporting frame.

It will be understood that the work holder platens 32 and 33 may be provided with any kind of suitable and appropriate work holding fixtures. In the construction shown in the drawings, the machine is shown equipped wtih fixtures 108 and 109 of identical construction secured thereto by cap screws 110 and 111 respectively, a key 112 being provided for taking the shear stress. The fixtures are of idential construction, and, as shown most clearly in Fig. 8, comprise a shaft 113 having a cam 114 keyed thereto, which engages and rocks one end 115 of a lever 116, which is pivoted on a pin 117. The opposite end 118 of the lever 116 is adapted to engage and bear down on a work piece 119 and hold the same between the lever and a bearing block 120, which is set into the base of the fixture 108. A spring pressed plunger 121 is provided for normally rocking the lever in a direction to release the work piece 119, which in the present instance is shown as being a connecting rod bearing cap.

The cam shaft 113 is journaled in spaced upstanding side walls integrally formed on the fixture 108, and one end protrudes beyond the outer side thereof and is provided with a hand lever 122 by which the work piece 119 may be quickly and readily clamped into position and released therefrom.

In the operation of this broaching machine, a work piece 119 is secured in one of the work holders by rotation of the hand lever 122 which causes the cam 114 to raise the end 115 of the lever 116 so that the opposite end 118 thereof will grip the work piece against the block 120 which is set into the work holder 108.

The machine is then started and fluid pumped by the motor 15 will pass into the hydraulic cylder 71 through either of the piston rods 72 or 73, depending upon the setting of the control valves. It will be understood that this machine operates through a definite cycle, the details of which are fully disclosed in applicant's herein referred to copending application. Assuming that the fluid passes into the piston rod 72, it will enter the cylinder 71 through the opening 76 and cause the cylinder 71 to move to the left, as viewed in Figs. 4 and 5 of the drawings. Movement of the cylinder will slide the cam plate 44 to the left, thereby sliding the work holding platen 32 forwardly toward the broach 24, as viewed in Fig. 3 of the drawings, the movement of the platen being caused by engagement of the cam lug 52 of the pin 54 contacting the side walls of the arcuate slot 50 which is formed in the top surface of the cam plate 44.

As the platen 32 approaches the broach, its movement is slowed up due to the positioning of the arcuate slot with respect to the direction of movement of the platen, and the accurate positioning of the piece of work held in the fixture 108 with respect to the broach 24 is affected by abutting engagement of the face of the stop 68 against the complementary stop face of the plate 69, as seen most clearly in Figs. 8, 9 and 10 of the drawings.

At the time when the contact faces are in abutting relation, the cam lug 52 is still in substantial spaced relation to the end of its slot 50 so that the hydraulic pressure within the cylinder continues to hold the platen 32 tightly and rigidly against the stop face 68, and it will be noted that the angle of the slot 50 with respect to the path of travel of the platen 32, when in its inner position, is such that the force is being applied through a relatively small or flat angle, thereby wedging the work holding platen 32 tightly against the stop face 68 in such a manner that the broach acting on the work piece will not reverse the movement of the platen. It is also to be noted that the force applied to hold the platen against the stop face 68 is in direct alignment with the work piece and broach, so that a very sturdy and rigid holding of the work piece is secured, thereby permitting the broach to make a cut with great accuracy on the work piece, and subsequent work pieces will likewise be held to extremely close limits of precision.

By having the cam lug 52 in substantial spaced relation to the end of its slot 50 when the platen is abutting against the stop face 68, it will be evident that considerable wear on the face of the cam lug 52 may occur without in any wise affecting the accurate positioning of the platen 32, as such wear will merely mean that the cam lug 52 will approach more nearly to the end of its cam slot. Inasmuch as the abutting stop faces are not subjected to any sliding friction, there will be substantially no wear whatever on these parts even over a period of extremely long use.

When the work holder platen 32 is moved forward, the platen 33 is moved simultaneously in the opposite direction away from its broach by engagement of the cam lug 53 against the side walls of the cam slot 51 so that as one of the platens is moved toward its broach, the other platen is always moved simultaneously away from its broach.

When the platen carrying the piece of work has moved into position to be acted on by its broach, the broaching ram will then move downwardly so as to operate on the work piece, and while this is being done, the operator of the machine may remove the work piece from the opposite fixture and replace it with another piece which is clamped in position ready to be operated on by its respective broach.

It is to be noted that the work holding platens 32 and 33 are slidable on broad, rigid bearing surfaces 34, 35, 40 and 41 so that the platens are held with extreme rigidity to resist downward pressure caused by the broaches. Also any tendency to rock, either toward or away from the broach, is prevented by the hold-down bars 36, 37 and 42. With this arrangement, the work piece may be machined by the broach with extreme accuracy and precision, and subsequent work pieces are maintained within the extremely close precision limits now demanded in the industry.

The pins 54 and 55 which carry the cam lugs 52 and 53, respectively, are mounted in eccentric bushings so that manufacturing inaccuracies may be compensated for in the assembly of the machine. When the parts are assembled and the lugs 52 and 53 are in proper position in their respective slots, which position can be secured by rotation of their respective eccentric bushings, then the holes are drilled for the attaching screws 58 which hold the bushings in their respective platens.

As shown most clearly in Figs. 8, 9 and 10 of the drawings, the stop faces 68 and 69 are positioned well back under their respective platens so that chips from the broaching operations will not be able to get between these contacting faces, and furthermore, the faces are sealed from the accidental entry of any foreign matter by the felt wipers 67. With this arrangement, there is substantially no possibility of any particle of foreign matter getting between the contacting faces, the result of which would be to stop the platen before it had moved to its correct position, and thereby cause an inaccuracy on the work piece being machined.

Although but one specific embodiment of this invention has been herein shown and described, it will be understood that numerous details of the construction illustrated may be altered or omitted without departing from the spirit of this invention as defined by the following claims.

What is claimed is:

1. In a broaching machine, a reciprocable broaching tool ram, a work holder platen transversely reciprocable toward and away from said ram by straight line translational movement, and a cam plate movable by straight line translational movement transversely to the path of travel of said platen for actuating said work holder platen.

2. In a broaching machine, a reciprocable broaching tool ram, a work holder transversely reciprocable toward and away from said ram, an abutment for limiting movement of said work holder toward said ram, a cam plate reciprocable transversely to the path of travel of said work holder, means for actuating said cam plate, said cam plate having an arcuate slot therein, and a lug on said work holder extending into said slot, said slot and lug being arranged so that reciprocation of said cam plate will move said work holder toward and away from said ram, and when said work holder is moved inward toward said ram, the angle of said slot with respect to the path of movement of said work holder will wedge said work holder against said abutment.

3. In a broaching machine, a reciprocable broaching tool ram, a work holder transversely reciprocable toward and away from said ram, a cam plate movable transversely to the path of travel of said work holder, said cam plate having a cam slot therein, a lug on said work holder fitting in said cam slot, said lug being shaped to the side walls of said cam slot so as to present a relatively broad bearing surface for engagement with the side walls of said slot.

4. In a broaching machine, a horizontal frame support, a vertically disposed broaching ram at the rear edge of said support, a horizontally reciprocable work supporting platen on said horizontal frame support, and movable toward and away from said broaching ram, a cam plate reciprocable on said horizontal frame support beneath said platen and movable transversely to the path of travel thereof, said cam plate having a cam groove therein, a vertically disposed pin mounted in said platen, said pin having a depending end fitting in said cam groove, and means for reciprocating said cam plate for moving said platen toward and away from said broaching ram.

5. In a broaching ram, a main frame having a vertically disposed portion and a horizontally disposed portion, a pair of vertically reciprocable broaching tool rams on said vertically disposed frame portion, a pair of horizontally reciprocable independent work holder platens on said horizontally disposed frame portions, said platens being movable toward and away from said rams respectively, a unitary cam plate reciprocable on said frame in a path transverse to the path of travel of said platens, cam connections between said cam plate and platens for moving one of said platens toward its ram while simultaneously moving the other of said platens away from its ram, and means for actuating said cam plate.

6. A structure, as defined in claim 9, in which said cam plate is provided with a pair of cam slots and a lug on each of said platens extending into said slots for moving said platens when said cam plate is reciprocated.

7. In a broaching ram, a main frame having a vertically disposed portion and a horizontally disposed portion, a pair of vertically reciprocable broaching tool rams on said vertically disposed frame portion, a pair of horizontally reciprocable work holder platens on said horizontally disposed frame portions, said platens being movable toward and away from said rams respectively, abutments for limiting movement of said platens toward said rams, a unitary cam plate reciprocable on said frame in a path transverse to the path of travel of said platens, said cam plate having a pair of arcuate cam slots therein, a lug on each of said platens extending into the respective slots for moving said platens when said cam plate is reciprocated, said lugs being shaped to conform to the arc of curvature of said slots so as to provide a substantial bearing surface for engagement with the side walls of said slots, the angle between the arcuate slots and the path of movement of the cam plate being such that when the platens are moved toward the rams, the arcuate cam slots wedge them against said abutments.

8. In a broaching machine having a reciprocable broaching tool ram, a work holder transversely reciprocable toward and away from said ram by straight line translational movement, an abutment for limiting travel of said work holder toward said broaching ram, and a cam for reciprocating said work holder and movable by straight line translational movement transversely of the path of said work holder, said cam in one position being adapted to wedge said work holder against said abutment for holding the same in broaching position.

BENEDICT WELTE.
ALBERT H. WERDEN.

CERTIFICATE OF CORRECTION.

Patent No. 2,225,191.  December 17, 1940.

BENEDICT WELTE, ET AL.

It is hereby certified that error appears in the printed specification of the above numbered patent requiring correction as follows: Page 4, second column, line 30, claim 6, for the claim reference numeral "9" read --5--; and that the said Letters Patent should be read with this correction therein that the same may conform to the record of the case in the Patent Office.

Signed and sealed this 4th day of February, A. D. 1941.

(Seal)

Henry Van Arsdale,
Acting Commissioner of Patents.